US006934643B2

United States Patent
Kar et al.

(10) Patent No.: US 6,934,643 B2
(45) Date of Patent: Aug. 23, 2005

(54) ULTRA ACCURATE GAS INJECTION SYSTEM WITH VEHICLE TRANSIENT AIR SIMULATION

(75) Inventors: Krishnendu Kar, Webster, NY (US); Robert Semidey, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/737,035

(22) Filed: Dec. 15, 2003

(65) Prior Publication Data

US 2004/0260483 A1 Dec. 23, 2004

Related U.S. Application Data

(60) Provisional application No. 60/480,141, filed on Jun. 20, 2003.

(51) Int. Cl.[7] .............................................. G01F 17/00
(52) U.S. Cl. ................... 702/50; 73/863.03; 73/863.01; 73/23.34; 374/37; 137/3; 137/111; 137/606
(58) Field of Search ........................ 702/50; 73/863.03, 73/863.01, 23.34; 374/37; 137/3, 111, 606

(56) References Cited

U.S. PATENT DOCUMENTS

| | | | | |
|---|---|---|---|---|
| 4,823,591 A | * | 4/1989 | Lewis ......................... 73/1.26 |
| 5,650,565 A | * | 7/1997 | Nagy et al. ................... 73/199 |
| 6,235,254 B1 | * | 5/2001 | Murphy et al. ............. 423/212 |
| 6,314,948 B1 | * | 11/2001 | Cathcart ..................... 123/533 |
| 6,387,706 B1 | * | 5/2002 | Eden .......................... 436/127 |
| 6,401,694 B2 | * | 6/2002 | Minowa et al. ............. 123/478 |
| 6,405,745 B1 | * | 6/2002 | Kar et al. ....................... 137/2 |
| 6,553,818 B1 | * | 4/2003 | Blumke et al. ............. 73/118.1 |

* cited by examiner

*Primary Examiner*—Bryan Bui
*Assistant Examiner*—Stephen J. Cherry
(74) *Attorney, Agent, or Firm*—Jimmy L. Funke (57) ABSTRACT

An ultra accurate gas injection system with vehicle transient air simulation is provided. The device includes an input device, at least one mass flow device, an air flow device, a controller, such as a PC based controller, and an output device. The air flow device issues an air flow rate signal indicative of at least the actual air flow rate and receives an air flow control signal. The controller issues gas and air flow control signals, repeatedly reads the air flow rate signal and compares the actual air flow rate with the target air flow rate. The controller adjusts the air flow control signal such that the actual air flow rate is substantially equal to the target air flow rate. The mass flow device injects at least one gas into the air stream which is subsequently emitted into the external system to simulate exhaust gas from a vehicle.

32 Claims, 6 Drawing Sheets

ULTRA ACCURATE GAS INJECTION SYSTEM WITH VEHICLE TRANSIENT AIR SIMULATION

CROSS-REFERENCE TO RELATED APPLICATIONS

This application claims the benefit of U.S. Provisional Patent Application, Ser. No. 60/480,141, filed on Jun. 20, 2003.

TECHNICAL FIELD

The present invention relates to the injection of a precise quantity of gas into a system to simulate exhaust gas flow. In particular, the present invention relates to the injection of a precise quantity of at least one gas into an air stream to simulate exhaust gas flow when introduced into the system.

BACKGROUND OF THE INVENTION

The Clean Air Act of 1970 and the 1990 Clean Air Act set national goals of clean and healthy air for all and established responsibilities for industry to reduce emissions from vehicles and other pollution sources. The 1990 law further tightened the limits on automobile emissions and expanded Inspection and Maintenance (I/M) programs to allow for more stringent testing of emissions. Standards set by the 1990 law for automobile emissions include 0.25 grams per mile (gpm) non-methane hydrocarbons and 0.4 gpm nitrogen oxides. The standards are predicted to be further reduced by half in the near future.

Manufacturers of automobiles and emissions systems have risen to the challenge of reducing automotive emissions by designing Low-Emission Vehicles (LEVs), Ultra-Low-Emission Vehicles (ULEV), Super-Ultra-Low-Emission Vehicles (SULEVs) and Zero-Emission Vehicles (ZEVs). In particular, LEVs reduce the emissions by up to seventy percent, ULEVs reduce emissions by up to eighty-five percent, and SULEVs reduce emissions by up to ninety-six percent. For example, the emission requirement for a ULEV is that it emit no more than 0.04 grams of hydrocarbon per mile. A SULEV must emit no more than 0.01 gpm of hydrocarbons. The emission levels of these vehicles have been reduced to a level which even the most sophisticated equipment in a laboratory environment can not accurately measure. Furthermore, the emission levels have been reduced to a level which would require the I/M programs to use similarly sophisticated equipment at numerous testing locations, thereby rendering the I/M programs impractical and cost prohibitive. Corroborative of this fact is that America's car companies have signed agreements with three Department of Energy national laboratories to develop instruments which are capable of providing reliable, accurate, and high-speed measurement of the trace emissions from such vehicles.

These instruments require testing and calibration, a process which is rendered susceptible to inconsistent results and inaccuracies due to the minute levels of pollutants the instruments must detect. Typically, testing of instruments used in measuring emissions are themselves tested and/or calibrated by creating a flow of a precision mixture of gases, thereby simulating the exhaust of an ULEV vehicle, or by filling a Sealed Housing for Evaporative Determination (SHED) with a precision mixture of gas. The instrument under test is used to measure the known and precise mixture of gas and the measured results are then compared with the known composition of the gas. An accuracy parameter for the instrument under test can then be determined.

A typical ULEV currently in production emits no more than about 1 part per million (ppm) of hydrocarbon once the catalytic converter has reached its operating temperature. The above-described conventional methods of dispensing a given mass of gas are not capable of accurately and repeatably creating a gas having a concentration of 1 ppm of hydrocarbon, and therefore are not capable of simulating the exhaust gas concentration of an ULEV or SULEV. Furthermore, the conventional methods described above are not capable of delivering a mass of gas which is low enough to result in the gas having a very low concentration, which is hereby defined to be below about 20 ppm, in a reasonably small volume. More particularly, most emissions testing laboratories use a critical flow orifice (CFO) to dispense propane at room temperature. As described above, the "critical" flow rate of a CFO is determined in part by the ratio of the absolute static pressure at the nozzle inlet to the ambient temperature. For a given nozzle, this ratio must be kept above a predetermined minimum to maintain the "critical" flow. Emissions testing is typically performed at room temperature. Therefore, the only remaining variable for a given nozzle is its inlet pressure. Because of the low concentrations of undesirable gases emitted from ULEVs and SULEVs, simulating the exhaust of such a vehicle or filling a SHED with a gas having such a low concentration requires a very low flow rate from the CFO. Thus, either a smaller nozzle must be used or the inlet pressure must be reduced. The use of a smaller diameter nozzle is limited by machining tolerances. The use of an inlet pressure that is low enough to achieve such a low concentration of a component gas results in the ratio of pressure to temperature falling below the minimum ratio at which the flow rate through the CFO is predicted by the sonic principle. Thus, a CFO based on the sonic principle is not capable of injecting into a system or sealed enclosure a mass of gas which is small enough such that the gas will have a very low concentration. Therefore, a CFO is of little, if any, practical use in creating a gas having a concentration low enough to be of practical application in the testing and/or calibration of equipment intended for the measurement of emissions from a ULEVs and SULEVs.

The code of federal regulations requires that emissions testing laboratories perform a quality check on the equipment used in testing emissions. This test allows for an error of plus or minus two-percent in the concentration of a gas injected into a constant volume system or SHED. When testing and/or calibrating for a gas concentration of, for example, 30 ppm in the SHED, a two-percent error constitutes an error of 0.6 ppm in the concentration of the gas injected into the constant volume system or SHED. This same 0.6 ppm error, when testing at the level of, for example, 1 ppm, constitutes sixty-percent of the 1 ppm test level.

In an effort to overcome the deficiencies noted above, there exists an apparatus and method which enable the precise injection of at least one gas into a closed system in approximately the same concentration as the concentration of undesirable gases contained in the exhaust flow of an ULEV and SULEV. Once the concentrated undesirable gases are introduced into the closed system, the instruments intended to measure such low concentrations of gases may be tested and/or calibrated.

However, the devices that are used to calibrate and test the instruments described above are not capable of simulating actual exhaust gas flow conditions. The full vehicle exhaust that consists of airflow and the contaminant concentration cannot be recreated merely by injecting concentration of contaminants into an external test cell.

In addition, the transient air calibration of an engine management system are primarily done on a vehicle. Thus, automotive engine design engineers have to wait until prototype vehicles are build to finalize designing and building prototype components. Many times this requires significant increase in development time and cost in an era when vehicle manufacturers are trying to reduce the development time of a vehicle and production costs.

Therefore, what is needed in the art is an apparatus and method which will inject a precise quantity of at least one gas into an air stream to simulate exhaust gas flow when introduced into a system.

Furthermore, what is needed in the art is an apparatus and method which enable the precise injection of at least one gas into an air stream to simulate exhaust gas flow when introduced into a system at a predicable and very low rate of flow.

Moreover, what is needed in the art is an apparatus and method which enable the precise injection of at least one gas into an air stream to simulate exhaust gas flow when introduced into a system in approximately the same concentration as the concentration of undesirable gases contained in the exhaust flow for an ULEV and SULEV, thereby allowing testing and/or calibration of instruments intended to measure such low concentration of gases.

Even further, what is needed in the art is an apparatus and method which enable the creation of a precise flow of at least one gas into an air stream to simulate exhaust gas flow having approximately the same concentration of those gases as does the exhaust of an ULEV and SULEV.

Further what is needed in the art is an apparatus and method for calibrating vehicle intake system for transient conditions independent of a vehicle to eliminate the need of a prototype vehicle and thus reduce the program development time and cost.

SUMMARY OF THE INVENTION

In order to overcome the above-stated problems and limitations, there is provided an ultra accurate gas injection system that injects a gas at a precise flow rate into an air stream to simulate vehicle exhaust into an external system, thereby producing a precise concentration of the gas in the external system.

In general, the device of the present invention includes an input device, at least one mass flow device, an air flow device, a controller, such as a PC based controller, and an output device. The input device is used for inputting setpoint data such as a target gas flow rate for the flow of gas into the air stream and a target air flow rate for the flow of air into the system. The mass flow device allows gas to flow therethrough at an actual gas flow rate. In particular, the mass flow device issues a gas flow rate signal indicative of at least the actual gas flow rate and receives a gas flow control signal. The mass flow device is configured to control the actual gas flow rate dependent at least in part upon the gas flow control signal.

The air flow device allows air to flow therethrough at an actual air flow rate. The air flow device issues an air flow rate signal indicative of at least the actual air flow rate and receives an air flow control signal. The air flow device is configured to control the actual air flow rate dependent at least in part upon the air flow control signal.

The controller is electrically connected to the input device, the mass flow device, and the air flow device. The controller receives setpoint data from the input device and issues the gas flow control signal and the air flow control signal. The gas flow control signal is dependent at least in part upon the target gas flow rate contained within the setpoint data. The controller repeatedly reads the gas flow rate signal and compares the actual gas flow rate with the target gas flow rate. The controller adjusts the gas flow rate signal dependent at least in part upon the comparison of the actual gas flow rate with the target gas flow rate. Further, the controller is configured to adjust the gas flow control signal such that the actual gas flow rate is substantially equal to the target gas flow rate.

The air flow control signal is dependent at least in part upon the target air flow rate contained within the setpoint data. The controller repeatedly reads the air flow rate signal and compares the actual air flow rate with the target air flow rate. The controller adjusts the air flow rate signal dependent at least in part upon the comparison of the actual air flow rate with the target air flow rate. The controller is configured to adjust the air flow control signal such that the actual air flow rate is substantially equal to the target air flow rate. The controller also issues an output signal dependent at least in part upon at least one of the gas flow rate signal and the air flow rate signal.

The output device is electrically connected to the controller and receives the output signal. The output device indicates at least one of the actual gas flow rate and the actual air flow rate.

The present invention further provides for an air flow device having a fast reacting valve, a blower and an airmeter. The valve may be a choker valve or an electronically controlled valve (ETC), such as an electronic throttle control (ETC) valve, which is adapted to receive the air flow control signal from the controller. The airmeter is adapted to issue the actual air flow rate signal to the controller. The blower operates to move the air into the external system at a rate determined by the valve after the one or more gases are combined with the air stream. Moreover, the mass control device used in the present invention may be an exhaust gas recirculation (EGR) valve that sufficiently regulates the flow of a gas, such as carbon dioxide or nitrogen, so that the gas lines do not freeze. Furthermore, the present invention optionally utilizes a PC based controller with hardware and software interfaces to provide real time data acquisition.

Additional objects, advantages and novel features of the invention will be set forth in part in the description which follows, and in part will become apparent to those in the practice of the invention.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DESCRIPTION OF THE PREFERRED EMBODIMENT

Figure 1:
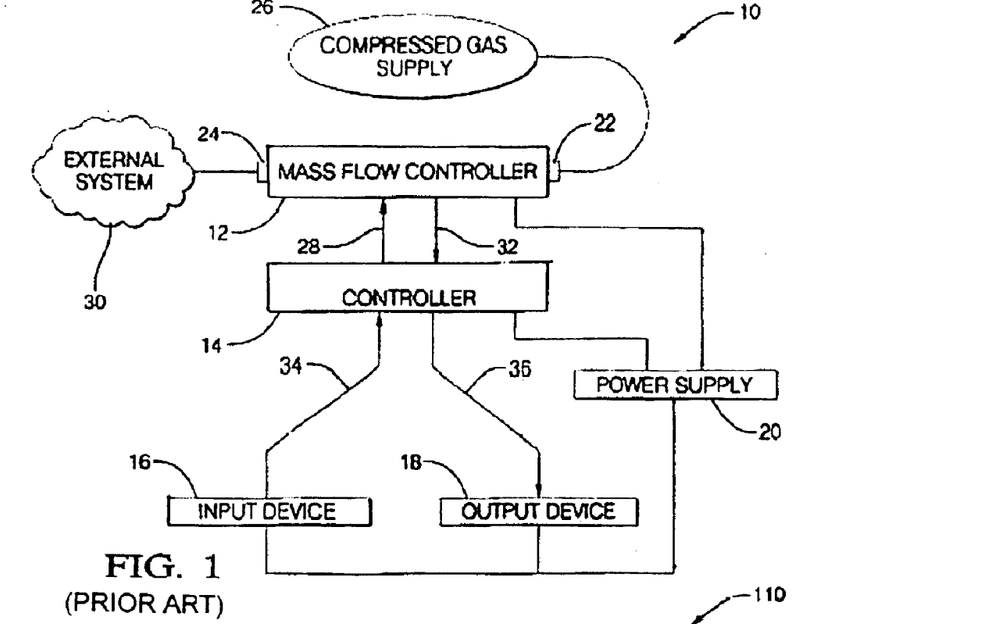
FIG. 1 is a schematic view of an ultra accurate gas injection system.

Referring now to the drawings and particularly to FIG. 1, there is shown an ultra accurate gas injection system (UAGIS) 10, as described in incorporated reference U.S. Pat. No. 6,405,745. UAGIS 10 includes mass flow controller (MFC) 12, controller 14, input device 16, and output device 18, all of which are electrically connected to and powered by power supply 20. Controller 14 can be either a programmable logic controller or a PC based controller.

Mass flow controller 12 includes gas inlet 22 and gas outlet 24. A supply of compressed gas 26 is connected to and flows into MFC 12 at gas inlet 22. The gas flows through MFC 12 and exits MFC 12 at gas outlet 24. MFC 12 receives flow control signal 28 issued by the controller 14, and is configured to control the rate of the flow of gas therethrough in response to flow control signal 28. Gas outlet 24 is connected to external, separate system 30. Gas exits gas outlet 24 at a flow rate which is controlled by MFC 12 based at least in part upon flow control signal 28, and then flows into external, separate system 30. MFC 12 issues flow rate signal 32 based upon the actual flow rate of the gas flowing therethrough.

Controller 14 receives setpoint data signal 34 which includes a desired rate of flow for the gas as entered by a user through input device 16. The desired flow rate may be constant or may vary with time. Controller 14 includes a number of internal memory locations or internal registers (not shown). Controller 14 stores the desired rate of flow in, for example, one of its registers or an external random access memory (not shown). Based at least in part upon the desired rate of flow information contained within setpoint data signal 34, controller 14 issues flow control signal 28 to MFC 12. Controller 14 receives flow rate signal 32 from MFC 12 and is configured to compare flow rate signal 32 to the desired rate of flow contained in setpoint data signal 34. Based upon this comparison, controller 14 adjusts flow control signal 28 to either increase or decrease the actual rate of gas flow through MFC 12. Controller 14 is configured to repeat the process of reading flow rate signal 32, comparing flow rate signal 32 to the desired rate of flow, and adjusting flow control signal 28. This process is repeated until the actual rate of flow is equal to the desired rate of flow. Once the actual rate of flow equals the desired rate of flow, controller 14 continues to monitor flow rate signal 32 and adjust the flow control signal 28 as necessary. Controller 14 issues output signal 36, which is received by output device 18. Output signal 36 includes the actual flow rate of the gas through MFC 12.

Output device 18 is electrically connected to controller 14 and receives output signal 36. Based on output signal 36, output device 18 indicates the actual flow rate of the gas through MFC 12. Output device 18 may be a printer, a series of LEDs, a cathode ray display tube, or other suitable output device. Output device 18 can be configured to display information in addition to the actual flow rate of the gas through MFC 12, such as, for example, the desired rate of flow, the difference between the actual rate of flow and the desired rate of flow, the amount of time for which gas has been flowing through MFC 12, and a countdown of time for which gas will be flowing through MFC 12.

Input device 16 may be a keyboard, numeric keypad, mouse or other input device through which a user can enter information and commands into controller 14. Such inputs include, for example, the desired rate of flow of the gas into external system 30. Input device 16 is electrically connected to controller 14. For applications where the desired rate of flow is fixed, or constant, input device 16 can be alternately configured as, for example, a read only memory device containing the desired rate of flow, which is read by controller 14.

Figure 2:
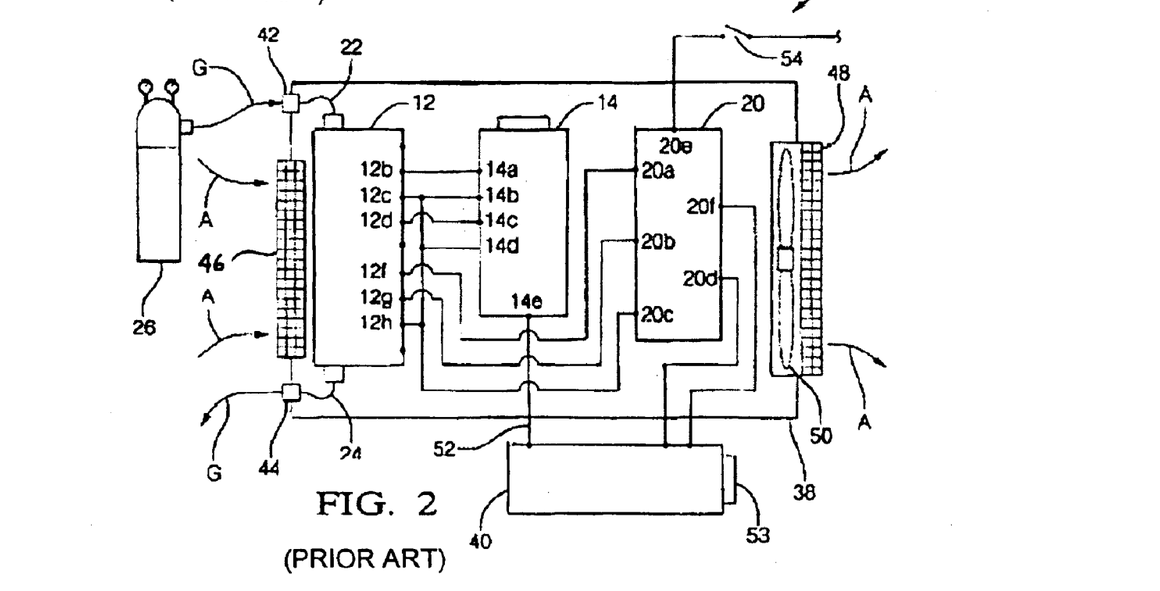
FIG. 2 is a schematic view of a second type of ultra accurate gas injection system.

Another version 110 of an UAGIS, as disclosed in U.S. Pat. No. 6,405,745, is shown in FIG. 2. The same reference numbers have been used to refer to the elements which are common to both of the ultra accurate gas injection systems 10, 110. UAGIS 110 includes MFC 12, controller 14, power supply 20, case 38, and touch screen display 40. Each of MFC 12, controller 14 and power supply 20 of ultra accurate gas injection system 110 are disposed within case 38. Each of MFC 12, controller 14, and touch screen display 40 are electrically connected to and powered by power supply 20.

Case 38 includes case gas inlet 42 which is connected to gas inlet 22 of MFC 12, and case gas outlet 44 which is connected to gas outlet 24 of MFC 12. Case gas inlet 42 is connected to compressed gas supply 26, thereby connecting gas inlet 22 of MFC 12 to gas supply 26. Case 38 also includes a cool air inlet 46 and a hot air outlet 48. The cool air entering through cool air inlet 46 absorbs heat from MFC 12, controller 14, power supply 20 and any other components disposed within case 38, and exits as hot air through hot air outlet 48. An electric cooling fan 50 is disposed adjacent to the hot air outlet 48, and acts to draw air into, through, and out of case 38 in the direction indicated by arrows A. Case 38 is of predetermined dimensions sufficient to house MFC 12, controller 14 and power supply 20, and is constructed of a strong yet lightweight material, such as, for example, molded fiberglass or aluminum, thus rendering ultra accurate gas injection system 110 fully portable.

MFC 12 inputs 12c and 12h are electrically connected to power supply 20 output 20c, which ties those inputs to ground potential. MFC 12 input 12f is electrically connected to power supply 20 output 20a, which provides the appropriate negative bias to input 12f of MFC 12. MFC input 12g is electrically connected to power supply 20 output 20b, which provides the appropriate positive bias to input 12g of MFC 12. Flow control signal 28 is generated on output 14c of controller 14, which is electrically connected to input 12d of MFC 12. MFC 12 reads flow control signal 28 from input 12d, and is configured to control the rate of the flow of gas therethrough dependent at least in part upon flow control signal 28. Gas exits gas outlet 24 of MFC 12, flows through case gas outlet 44 and into external system 30 at a flow rate which is controlled by MFC 12 dependent at least in part upon flow control signal 28. Gas flow is indicated by arrows G. MFC 12 is configured to determine the actual flow rate of the gas flowing therethrough, and generates flow rate signal 32 on output 12b based upon that actual flow rate.

MFC 12 is selected from any number of commercially available mass flow controllers, such as, for example, model no. 201-APASVCAA manufactured by Porter Instrument Company located in Hatfield, Pa. The selection of a particular MFC 12 is determined in part by the application requirements, such as, for example, the desired maximum and minimum flow rates. UAGIS 110 provides a flow rate which is variable from 0–10 standard cubic feet per minute (scfm). However, by selecting a different mass flow device having a different flow rate, UAGIS 110 can provide a flow rate which is variable from 0 to 1000 standard litres per minute (slpm), or above, and provides repeatable flow control to as low as 0.2 standard cubic centimeters per minute (sccm) when operated within the conditions specified by the manufacturer. More particularly, MFC 12 is sensitive to the pressure at gas inlet 22. A typical input pressure, and one which yielded the most desirable results, is about one-third of the rated input pressure for this particular MFC 12.

Controller 14 may be electrically connected to touch screen display 40 through communications port 14e and communications cable 52, and receives setpoint data signal 34. Controller 14 is configured to read and store in an internal register the desired flow rate which is included within setpoint data signal 34. Dependent at least in part upon the desired flow rate, controller 14 issues flow control signal 28 on output 14c. Controller 14 input 14a is electrically connected to output 12b of MFC 12 and reads flow rate signal 32 therefrom. Controller 14 is configured to compare flow rate signal 32 to the desired flow rate. Based upon this comparison, Controller 14 adjusts flow control signal 28 to either increase or decrease the actual flow rate of gas through MFC 12. Controller 14 is configured to repeat the process of reading flow rate signal 32, comparing flow rate signal 32 to the desired flow rate, and adjusting flow control signal 28 until the actual rate of flow is equal to the desired rate of flow. Once the actual flow rate equals the desired flow rate, controller 14 continues to monitor flow rate signal 32 and adjust the flow control signal 28 as necessary. Controller 14 issues output signal 36 to communications port 14e to touch screen display 40 via communications cable 52. Output signal 36 includes the actual flow rate of the gas through MFC 12, and control data which controls the operation and display of touch screen 40. Output signal 36 can also include other parameters, such as, for example, an amount of time during which gas has been flowing through MFC 12, a remaining amount of time for which gas will be flowing through MFC 12, and the mass of gas which has flown through MFC 12.

Controller 14 includes a number of data registers, or memory locations, in which are stored various items of information such as, for example, the desired flow rate as read from setpoint data signal 34. The data registers of controller 14 can store various other information, such as, for example, a desired time duration during which the injection of gas will occur, a start time and stop time for the injection of gas, a mass of gas to be injected, and interrupt codes. Controller 14 is selected from any number of commercially available controllers, such as, for example, the Micrologix 1000 programmable logic controller manufactured by Allen-Bradley Corporation. The Micrologix 1000 is analog-capable and has 16 bit resolution, although 8 bit resolution would be sufficient for use in the ultra accurate gas injection system.

Touch screen display 40 is a liquid crystal touch screen display capable of displaying information and registering as input the touch of a user. Touch screen display 40 is electrically connected to outputs 20d and 20f of power supply 20. Outputs 20d and 20f supply the appropriate bias voltage for touch screen display 40. Touch screen display 40 is attached to or disposed within case 38 such that the screen of touch screen display 40 is visible and accessible to the user. Controller 14 is configured to send control data such that touch screen display 40 displays a series of menus, each of which contain soft keys that can be selected by a user pressing the screen in the area of the soft key. For example, controller 14 is configured to send control data to touch screen 40 such that touch screen 40 displays a numeric keypad which enables a user to enter a desired flow rate and/or a desired injection time period by touching the soft keys of the numeric keypad displayed on touch screen 40. Touch screen 40 registers any touch, or input, and issues set point data signal 34 through communications cable 52 to controller 14. Touch screen display 40 includes a data port 53 through which access to, for example, flow rate data and time data is provided. Data port 53 is an RS-232 port and provides the data in machine readable format.

Figure 3:
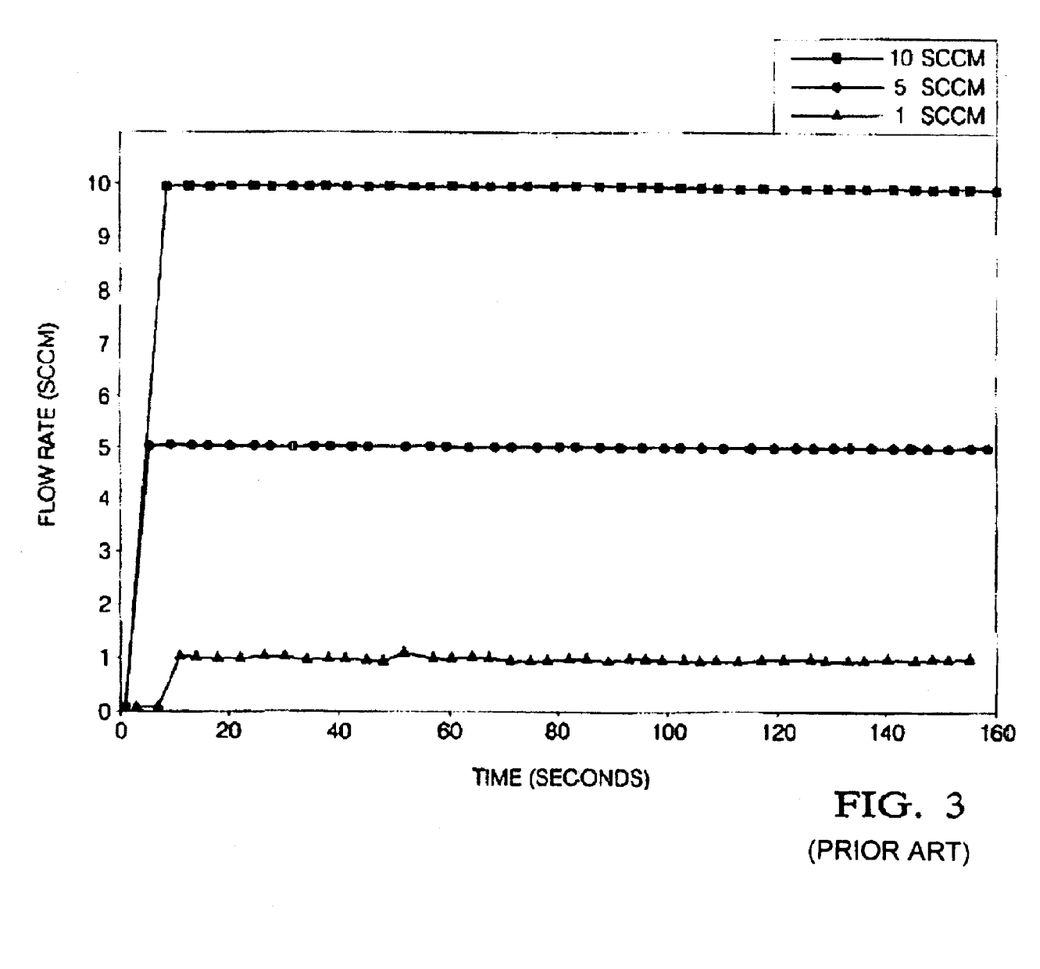
FIG. 3 is a graph illustrating the constant flow rate obtained with the ultra accurate gas injection system shown in FIGS. 1 and 2.

As shown in FIG. 3, an output flow rate of 1 sccm is accurately obtained with UAGISs 10 and 110. At his low flow rate of 1 sccm, it is possible to accurately inject a concentration of gas as low as 0.56 ppm in a system volume as small as 100 cubic feet over a 5 minute period. Even lower concentrations can be injected into external system 30 if the 5 minute period is reduced.

Input 20e of power supply 20 is electrically connected to, for example, a conventional 120 Volt source of electrical power (not shown) through switch 54. Power supply 20 is configured to supply the appropriate D.C. voltages required by MFC 12, controller 14, touch screen display 40 and any other components of ultra accurate gas injection system 110.

Figure 4:
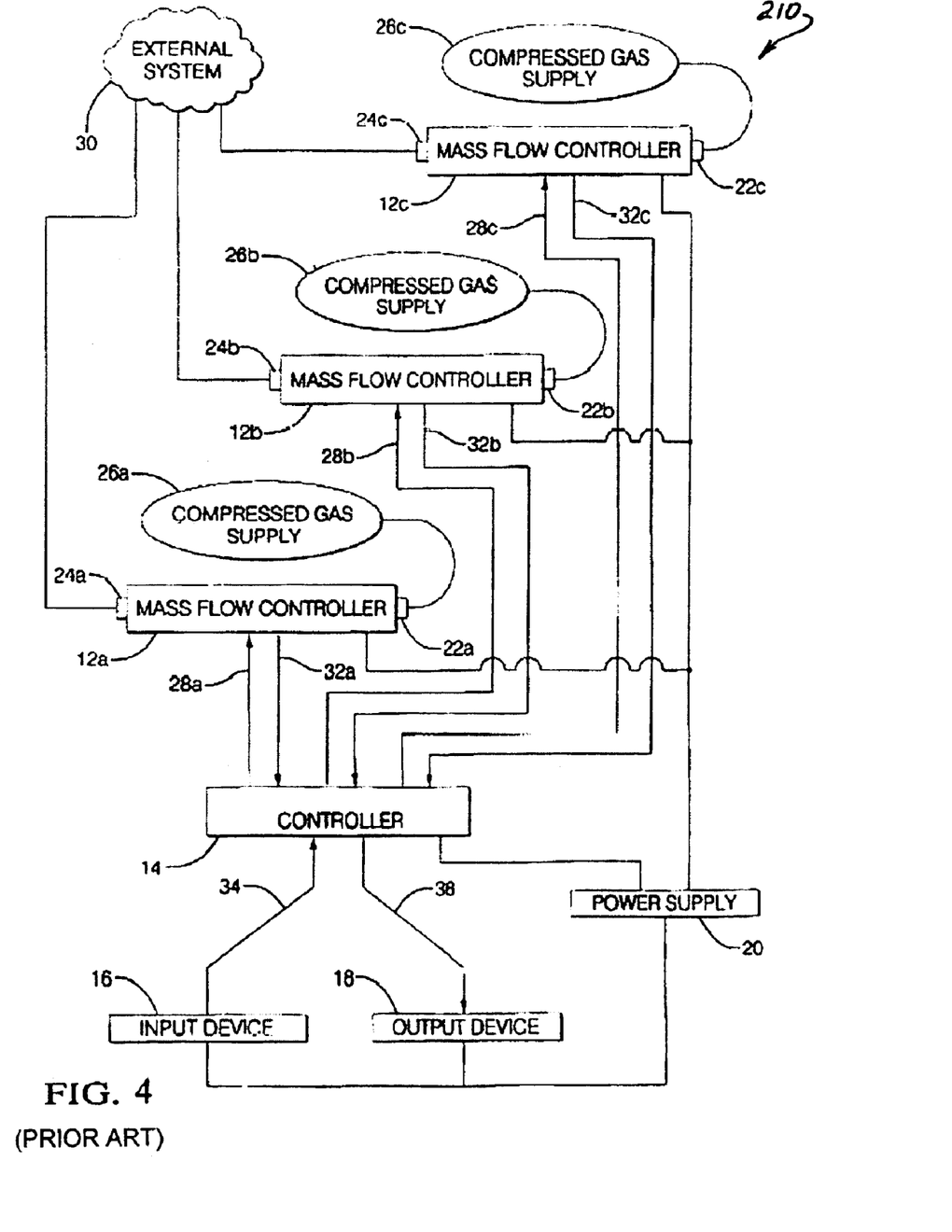
FIG. 4 is a schematic view of a third type of an ultra accurate gas injection system.

Referring now to FIG. 4, another UAIGIS 210 is shown, as disclosed in U.S. Pat. No. 6,405,745. UAGIS 210 operates in a substantially similar manner as UAGIS 10 and 110. However, UAGIS incorporates multiple mass flow controllers such as, for example, MFC 12a, 12b and 12c to inject gasses from compressed gas supplies 26a, 26b and 26c, respectively. Each of MFC 12a, 12b and 12c are connected to controller 14. In conjunction with controller 14, each of MFC 12a, 12b and 12c control the flow of gas therethrough and into external system 30. Thus, UAGIS 210 enables the injection of a plurality of gases into external system 30 with the same precision and advantages as UAGIS 10 and 110 as discussed herein.

Figure 5:
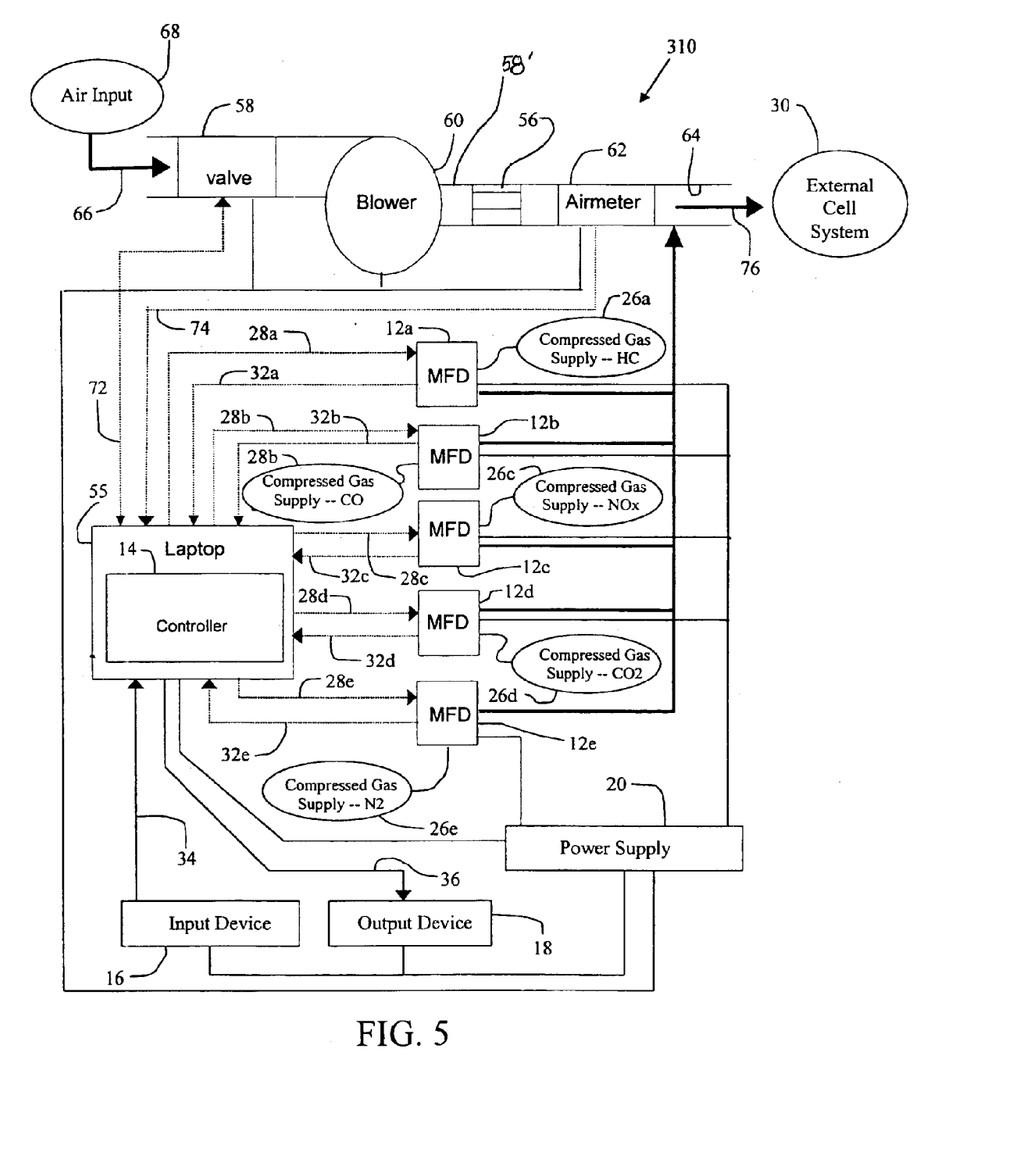
FIG. 5 is a schematic view of one embodiment of an ultra accurate gas injection system of the present invention which includes an air flow device.

Referring now to the present invention and particularly to FIG. 5, reference numeral 310 designates an ultra accurate gas injection system (UAGIS) capable of simulating vehicle exhaust in accordance with one embodiment of the present invention. In the following description of UAGIS 310, the same reference numbers have been used to refer to the elements which are common to UAGIS 310 and the aforementioned UAGISs 10, 110, 210.

As shown in FIG. 5, controller 14 may be a programmable logic controller, or a personal computer based controller with software and hardware interfaces for real time data acquisition. This provides a user friendly operating environment which may be incorporated into a laptop 55, or a desktop, workstation, server, remote device and/or other similar types of devices. In addition, input device 16 may be a keyboard, numeric keypad, mouse, ethernet, internet, profibus, CAN, RS-485, RS-232 or other input device through which a user can input information and commands into a personal computer based controller 14.

Furthermore, in addition to using mass flow controllers to control the gas flow within UAGIS 10, 110, 210, UAGIS 310 may utilize various types of mass flow devices 12 that are adapted to control the amount of gas that is introduced into the external system 30 over a given time period. In particular, the mass flow devices that may be used include, but are not limited to, pintle valves, diesel or gasoline type exhaust gas recirculation (EGR) valves, digital or analog mass flow controllers, and any other type of analog or digital mechanism that controls the flow of fluid from the MFD 12 to the external system 30. The use of an EGR valve is particularly useful for introducing gases such as carbon dioxide and nitrogen into the external system 30 using UAGIS 310. For instance, if a mass flow controller was used to control the flow of carbon dioxide or nitrogen in the injection system, the high pressure differential would cause the carbon dioxide and nitrogen to freeze thereby preventing the release of these gases into the external system 30. Therefore, it is preferable to use a MFD that reduces the pressure differential by providing a larger exit opening, such as an EGR valve, when introducing a gas such as carbon dioxide or nitrogen. For instance, using an 14 g/s EGR valve for carbon dioxide may provide a maximum flow rate of approximately 450 lpm, and using a 40 g/s EGR valve for nitrogen may produce a maximum flow of approximately 70 scfm, which will prevent the carbon dioxide and nitrogen from freezing the flow lines in UAGIS 310.

In general, UAGIS 310 may include a plurality of MFDs 12a, 12b, 12c, 12d and 12e, a PC based controller 14, a power supply 20, and an air flow device 56 for simulating exhaust gas flow and tailpipe concentrations within an external cell system 30. UAGIS 310 may also include a case 38 and a screen that may include a touch screen 40, a laptop or desktop PC.

As best seen in FIG. 5, the air flow device 56 includes a valve 58, a blower 60, an airmeter 62 and an exhaust tube 64. Valve 58 is adapted to control the amount of air 66 that travels from an air input 68 to blower 60. It will be understood and appreciated that valve 58 may be a choker valve, an electronic throttle control (ETC) valve, a damper or any other type of flow control mechanism with a fast response time (~150 ms) to control air flowing to blower 60. In particular, valve 58 allows a certain amount of air to pass to the blower depending upon the position of the throttle contained therein. For example, if the throttle is in a fully opened position, then blower 60 will operate to send a maximum amount of air through air flow device 56. If the throttle is twenty percent open, then blower 60 will only be able to send about twenty percent of the air through air flow device 56 relative to its maximum flow rate potential. Valve 58 is powered by power supply 20 and operatively connected with laptop 55 and controller 14. Specifically, valve 58 is adapted to receive an air flow rate signal 72 from controller 14 and send a throttle position signal 72 back to controller 14. Air flow rate signal 72 is a signal received by valve 58 instructing valve 58 to position its throttle so that it corresponds to an air flow rate. Throttle position signal 72 is a signal received by controller 14 that informs the controller as to the position of the valve throttle.

Blower 60 is adapted to draw air 66 through valve 58 and move it to airmeter 62 and out the exhaust tube 64 into external cell system 30. Blower 60 is also powered by power supply 20 and may move the air 66 at a rate of approximately 300 cfm or 100 g/s up to 250 g/s. Airmeter 62 is in communication with controller 14 and measures the actual flow rate of the air 66 coming through exhaust tube 64. After the airmeter 62 measures the actual flow rate of air 66, it is adapted to send an actual air flow rate signal 74 to PC based controller 14 indicating the actual flow rate of air 66 moving through exhaust tube 64. It is also relevant to note that airmeter 62 is preferably not a smooth approach orifice (SAO). Further, it should be understood that the air originating from air input 68 is generally not the same air contained in external cell system 30.

Optionally, there may be included an additional valve 58' mounted downstream of blower 60 which can be used to further regulate the air stream to simulate transient conditions at a variety of airflow conditions from part to full engine load.

MFDs 12a, 12b, 12c, 12d, 12e are connected to controller 14 and operate to inject gases from compressed gas supplies 26a, 26b, 26c, 26d, 26e, respectively, into exhaust tube 64 at a fixed or variable rate. The gases are injected from MFDs 12a, 12b, 12c, 12d, 12e into exhaust tube 64 so that the gases mix with, or are diluted in, the air 66 that is flowing from blower 60 to produce a simulated exhaust gas mixture 76 that ultimately enters external cell system 30.

In order to produce simulated exhaust gas mixture 76 of an ULEV or SULEV, different types of compressed gases may be used in MFDs 12a, 12b, 12c, 12d, 12e. For instance, the compressed gas supplies 26a, 26b, 26c, 26d, 26e may be filled with hydrocarbons (HC), carbon monoxide (CO), nitrogen oxides ($NO_x$), carbon dioxide ($CO_2$) and nitrogen ($N_2$), respectively. As such, in the present invention, a digital MFD may be used for MFDs 12a, 12b, 12c to control the flow of HC, CO and $NO_x$ that flows into exhaust tube 64. In addition, the present invention preferably uses a diesel EGR valve for MFD 12e for supplying $N_2$ while a gasoline EGR valve is used for MFD 12d for supplying $CO_2$ so that the flow lines for each do not freeze due to the high pressure differential between the input and output of MFD 12d, 12e. The EGR valves provide a large opening and will allow a greater flow of $CO_2$ and $N_2$ in exhaust 64, in the range of 0 to 200 lpm. Further, the flow opening for the diesel EGR valve may be larger than the flow opening for the gasoline EGR valve. The present invention can be used for both low parts per million (ppm) constant flow rate injection or variable flow rate injection to simulate emissions. Additionally the MFDs may be digitally operated which results in a controller accuracy of approximately 1% by point. For example, for a HC mass flow controller with a range of 10 lpm, the 100 sccm range will have a maximum error of 2 sccm.

Although not shown in FIG. 5, in UAGIS 310, touch screen 40 may be attached to or disposed within case 38. However, it is to be understood that touch screen display 40 can be otherwise disposed, such as, for example, remotely from UAGIS 310 so long as touch screen display 40 is electrically connected to controller 14. While touch screen display 40 is described as a liquid crystal display, it is to be understood that touch screen display 40 may be alternately configured as, for example, a cathode ray tube or flat panel display having touch screen capability. Furthermore, it will be understood that UAGIS 310 may also incorporate a cool air inlet 46, hot air outlet 48 and electric cooling fan 50 to keep the system cool within case 38 even though it is not shown in FIG. 5.

In UAGIS 310, power supply 20 is configured to be connected to a conventional source of electricity. However, it is to be understood that UAGIS 310 may be alternatively configured to be electrically powered by a battery, solar power, or virtually any other source of electricity.

In use, UAGIS 310 is turned on by activation of switch 54 (FIG. 2). Controller 14 is configured to undergo a period of warm up during which no operations are performed. After the warm up period, controller 14 initializes all data registers and/or memory locations, and monitors the controller 14 communications port for input data from input 16. When data, such as, for example, a desired flow rate, a time duration for injection of gas, a desired air flow rate and a time duration for the blower 60 to be activated, is input via touch screen display 40 or an other input device, the data is sent to controller 14 as setpoint data signal 34. Based upon setpoint data signal 34, controller 14 establishes digital equivalents for the data entered. PC based controller 14 then issues flow control signals 28a, 28b, 28c, 28d, 28e and air flow control signal 72 to valve 58. At this point, valve 58, blower 60 airmeter 62, MFD 12a, 12b, 12c, 12d and 12e all are turned on.

Depending on the desired air flow rate signal sent from setpont data signal 34, valve 58 opens a throttle, not shown, to a point that corresponds to the desired flow rate. For instance, if the flow rate signal 72 corresponded to the maximum flow rate possible for the air flow device 56, then the throttle would be fully opened. Once the throttle on the valve 58 is opened, the throttle control signal 72 is sent back to controller 14 to inform the controller how far the throttle is opened. Air 66 from air input 68 is then drawn into exhaust tube 64 through valve 58 by blower 60. Air 66 moves through blower 60 to airmeter 62 where the actual air flow rate is measured and reported to controller 14 by actual air flow rate signal 74. Controller 14 then compares the actual air flow rate with the desired air flow rate provided in the set point signal 34. Based upon this comparison, PC based controller 14 adjusts air flow control signal 72 to either increase or decrease the actual air flow rate of gas through exhaust tube 64 until the actual air flow rate and the desired air flow rates are equal. During this adjusting process, air 66 is flowing by airmeter 62 and into external cell system 30.

As the air flow rate is being adjusted, controller 14 issues gas control signals 28a, 28b, 28c, 28d, 28e to each of the mass flow controllers 12a, 12b, 12c and EGR valves 12d, 12e providing a gas flow rate to each. At this point, all of the gases start to flow from compressed gas supply 26a, 26b, 26c to the mass flow controllers 12a, 12b, 12c, respectively, and from compressed gas supply 26d, 26e to EGR valves 12d, 12e, respectively. As gas flows through MFDs 12a, 12b, 12c, 12d, 12e, flow rate signals 32a, 32b, 32c, 32d, 32e are issued to controller 14. Controller 14 reads flow rate signals 32a, 32b, 32c, 32d, 32e and compares them with the desired flow rate. PC based controller 14 then independently adjusts flow control signals 28a, 28b, 28c, 28d, 28e so that the flow rate signals 32a, 32b, 32c, 32d, 32e are equal to the desired flow rate. The process of reading flow rate signals 32a, 32b, 32c, 32d, 32e and comparing them with the desired flow rate provided in set point data 34, and adjusting flow control signals 28a, 28b, 28c, 28d, 28e is repeated until each of the flow rate signals 32a, 32b, 32c, 32d, 32e are equal to the desired flow rate.

After the HC, CO, $NO_x$, $CO_2$ and $N_2$ gases are released from MDFs 12a, 12b, 12c and EGR valves 12d, 12e, they are transferred to and expelled within exhaust tube 64. At this point, the HC, CO, $NO_x$, $CO_2$ and $N_2$ gases are mixed and diluted within air 66 passing by airmeter 62 to form simulated exhaust gas mixture 76. Simulated exhaust gas mixture 76 is then emitted into external cell system 30 so that it may be used to calibrate, monitor or test instruments that are designed to test contaminants found in vehicle emissions. The instruments that may be calibrated may include, but are not limited to, a sampling system, a mini-diluter and an ultra sonic flow meter.

Output device 18 is electrically connected to controller 14 and receives output signal 36. Based on output signal 36, output device 18 indicates the actual air flow rate of the air flowing through airmeter 62 and the actual flow rate of the gas through MFDs 12a, 12b, 12c, 12d, 12e. Output device 18 may be a printer, a series of LEDs, a cathode ray display tube, or other suitable output device. Output device 18 can be configured to display information in addition to the actual flow rate of the gas and air through the system, such as, for example, the desired rate of flow for the gas and air, the difference between the actual rate of flow and the desired rate of flow for the gas and air, the amount of time for which gas and air have been flowing through the MFDs 12a, 12b, 12c, 12d, 12e and air flow device 56, and a countdown of time for which gas and air will be flowing through the MFDs 12a, 12b, 12c, 12d, 12e and air flow device 56.

Controller 14 continues to monitor the actual air flow rate signal 74 and the flow rate signals 32a, 32b, 32c, 32d, 32e, perform the comparison of each with the desired air and gas flow rates, and adjust air flow control signal 72 and flow control signals 28a, 28b, 28c, 28d, 28e until the desired time duration for the air input and injection of gas has expired. At the expiration of the desired time period for exhaust simulation, controller 14 is configured to shut off the blower 60, valve 58 and airmeter 62 and the flow of gas through MFDs 12a, 12b, 12c, 12d, 12e via flow control signals 28a, 28b, 28c, 28d, 28e respectively.

Figure 6:
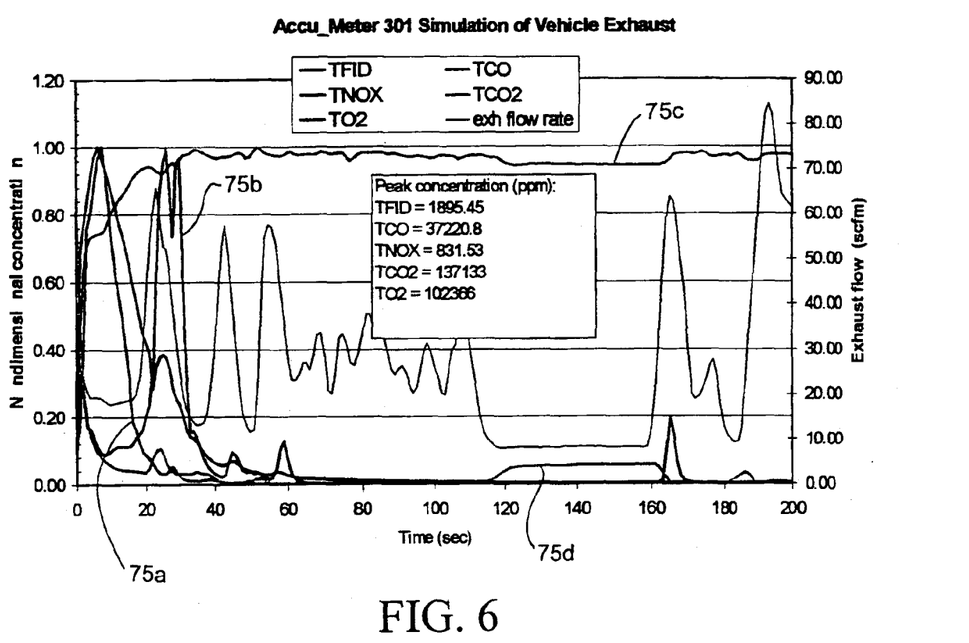
FIG. 6 is a graph illustrating the flow rates of a plurality of gases obtained with the ultra accurate gas injection system of the present invention.

A graphical representation of a test result performed over a period of about 200 seconds is best seen in FIG. 6. In particular, the graph illustrates the varying concentrations of the gases (e.g., CO (75a), $NO_x$ (75b), $CO_2$ (75c) and $O_2$ (75d)) found in vehicle emissions that were introduced in an external cell system.

UAGIS 310 can accurately achieve very low flow rates, such as, for example 1 sccm with an accuracy of 1 percent, through the use of an appropriate MFD which enables system 310 to simulate exhaust gas flow of a low emission vehicle. Delivering such a low and accurate flow rate over a period of time permits the calculation of the mass for each of the delivered gases. The mass of the injected gas is given by the product of the injection flow rate, the injection time period, the density of the injected gas, and the concentration of the injected gas. The mass of the delivered gas is equal to the product of the volume of system 30, the density of the delivered gas, and the concentration of the delivered gas. Thus, one can derive that the concentration of the gas delivered into system 30 is equal to the product of the injection flow rate, the injection time period, and the concentration of the injected gas divided by the volume of system 30—all quantities which are known with substantial accuracy. Therefore, one can calculate the required fixed or varying gas concentrations as a function of time that need to be delivered into the air stream moving through exhaust tube 64 in order to simulate the exhaust of a vehicle for testing, calibrating or validating emission instruments such as, but not limited to, sampling systems, mini-diluters and ultra sonic flow meters.

In addition to the present invention providing an UAGIS for transient air simulation, it also may have other applications in the automotive industry such as ultra low concentration propane injection and transient air calibration. Using the principles of the present invention, air flow device 56 may be modified to calibrate the transient air of a vehicle.

Figure 7:
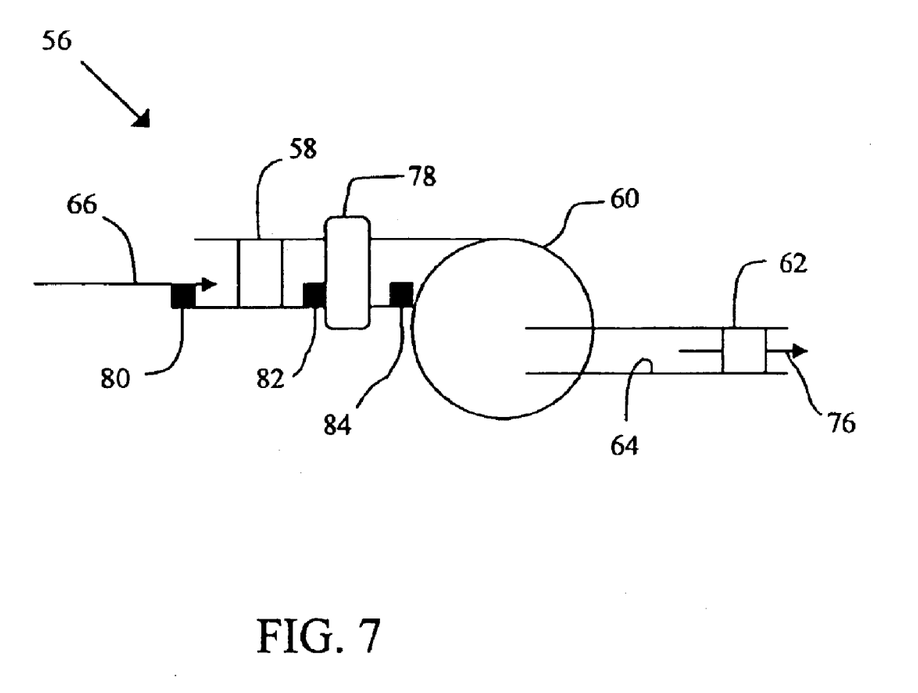
FIG. 7 is a schematic view of an alternative embodiment of the air flow device shown in FIG. 5.

As best seen in FIG. 7, air flow device 56 includes valve 58, blower 60 and airmeter 62 that pulls air 66 through exhaust tube 64 as described above. However, in order to calibrate the transient air of a vehicle, air flow device 56 also may include a manifold 78 that is positioned between the valve 58 and blower 60. Further, a transducer/thermocouple 80 may be positioned upstream of valve 58, a second transducer/thermocouple 82 may be positioned between valve 58 and manifold 78, and a third transducer/thermocouple 84 may be positioned between manifold 78 and blower 60. In general, the pressure transducer and thermocouples will provide pressure and temperature readings that will allow for the calculation of the pressure drop over the valve 58 and the manifold 78. In particular, the difference in the pressure and temperature readings from transducer/thermocouples 80, 82 may be used to calculate flow across valve 58. As for manifold 78, the difference in the pressure readings from transducer/thermocouples 82, 84 may be used to calculate the rate of rise and fall of pressures during throttle blip for transient air calibration. Moreover, this embodiment of the system may be used to calculate transient air at different altitudes or barometric pressure without the need of a vehicle. By using such a system and method, the emptying time of the manifold can be minimized. In addition, manifold improvements can be designed during prototype development which can offer significant savings with respect to engine and vehicle chassis dynamometer testing.

In addition, the present invention also may have applicability in the semiconductor industry for precisely controlling of thin film thickness and to etch films with precision. Further, the medical industry could utilize the inventive concepts of the present invention for precisely controlling gas and liquid flow.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed is:

1. An ultra-accurate gas injection device for injecting into an air stream a flow of gas to simulate exhaust gas flow into a system, said device comprising:
    an air flow device comprising an air blower for creating said air stream, an electronic throttle control (ETC) valve adapted to regulate air input to the blower to thereby adjust the air stream, and an airmeter adapted to measure an actual air flow rate of said air stream, and
    at least one mass flow device adapted to be connected to a gas supply, said mass flow device being connected to the air stream and adapted to control flow of gas to the air stream at an actual gas flow rate, wherein the gas enters the air stream to simulate the exhaust gas flow into the system.

2. The ultra-accurate gas injection device of claim 1, wherein said mass flow device is a pintle valve.

3. The ultra-accurate gas injection device of claim 1, wherein said mass flow device is an exhaust gas recirculation (EGR) valve.

4. The ultra-accurate gas injection device of claim 1, wherein said gas is selected from a group consisting of carbon monoxide, nitrogen oxides, carbon dioxide, nitrogen, hydrocarbons, and any combination thereof.

5. The ultra-accurate gas injection device of claim 4, wherein said device includes more than one mass flow devices, wherein a different gas is flowing through each of said mass flow devices.

6. The ultra-accurate gas injection device of claim 1, wherein said valve has a response time of approximately 150 ms.

7. The ultra-accurate gas injection device of claim 1, wherein said blower operates to move the air at approximately 250 g/s.

8. The ultra-accurate gas injection device of claim 1, wherein said air flow device includes a manifold.

9. The ultra-accurate gas injection device of claim 8, further comprising a plurality of transducer/thermocouple devices.

10. The ultra-accurate gas injection device of claim 9, wherein said manifold is positioned between said valve and said blower, and wherein a first transducer/thermocouple device is positioned upstream of said valve, a second transducer/thermocouple device is positioned between said valve and said manifold, and a third transducer/thermocouple device is positioned between said manifold and said blower.

11. The ultra-accurate gas injection device of claim 1, further comprising:
    an input device for inputting setpoint data, said setpoint data including a target gas flow rate for the flow of gas into the air stream and a target air flow rate for the flow of air into the system; and
    a controller connected to said input device, said mass flow device, and said air flow device.

12. The ultra-accurate gas injection device of claim 11 wherein said controller is a PC based controller.

13. The ultra-accurate gas injection device of claim 11 wherein:
    said mass flow device issues a gas flow rate signal indicative of at least said actual gas flow rate, said mass flow device receives a gas flow control signal and is configured to control said actual gas flow rate dependent at least in part upon said gas flow control signal,
    said air flow device issues an air flow rate signal indicative of at least said actual air flow rate, said air flow device receives an air flow control signal and is configured to control said actual air flow rate dependent at least in part upon said air flow control signal,
    said controller receives said setpoint data from said input device and issues said gas flow control signal and said air flow control signal,
    said gas flow control signal being dependent at least in part upon said target gas flow rate contained within said setpoint data, said controller comparing said actual gas flow rate with said target gas flow rate and adjusting said gas flow rate signal depending at least in part upon said comparison of said actual gas flow rate with said target gas flow rate, said controller being configured to adjust said gas flow control signal such that said actual gas flow rate is substantially equal to said target gas flow rate,
    said air flow control signal being dependent at least in part upon said target air flow rate contained within said setpoint data, said controller comparing said actual air flow rate with said target air flow rate and adjusting said air flow rate signal depending at least in part upon said comparison of said actual air flow rate with said target air flow rate, said controller being configured to adjust said air flow control signal such that said actual air flow rate is substantially equal to said target air flow rate.

14. The ultra-accurate gas injection device of claim 13, wherein said setpoint data includes at least one of a start time and a stop time, said start time corresponding to a time at which the flow of gas through said mass flow device and the flow of air through the air control device is to begin, and said stop time corresponding to a time at which the flow of gas through said mass flow device and the flow of air through the air control device is to cease, said controller being configured to start the flow of gas and air at said start time and to stop the flow of gas and air at said stop time by adjusting said gas flow control signal and said air flow control signal accordingly.

15. The ultra-accurate gas injection device of claim 13, wherein said input device comprises at least one of a keyboard, a numeric keypad, a mouse, ethernet, internet, profibus, CAN, RS-485, RS-232 and a touch screen display.

16. The ultra-accurate gas injection device of claim 13, wherein at least one of said target air flow rate and said target gas flow rate vary as a function of time.

17. The ultra-accurate gas injection device of claim 11, further comprising:
an output device connected to said controller, wherein said controller issues an output signal dependent at least in part upon at least one of said gas flow rate signal and said air flow rate signal, and wherein said output device receives said output signal and indicates at least one of said actual gas flow rate and said actual air flow rate.

18. The ultra-accurate gas injection device of claim 17, wherein said output device comprises at least one of a cathode ray tube, a flat panel display, a liquid crystal display, and a touch screen display.

19. The ultra-accurate gas injection device of claim 17, wherein said setpoint data includes a time period, said PC based controller counting said time period and stopping the flow of gas and through said at least one mass flow controller by adjusting said gas flow control signal and the flow of air through said air flow device by adjusting said air flow control signal upon the expiration of said time period.

20. The ultra-accurate gas injection device of claim 19, wherein said output device indicates at least one of said time period and said counting of said time period.

21. A method of injecting a precise concentration of at least one gas into an air stream to simulate exhaust gas flow into external system of known volume, said method comprising the steps of:
determining a desired concentration of each at least one gas to be contained within the air stream;
selecting a desired gas flow rate at which the at least one gas is injected into the air stream;
calculating a time period during which the at least one gas is injected into the air stream, said time period determined at least in part by said desired gas concentration, said desired gas flow rate and the volume of the external system;
selecting a desired air flow rate at which the air is injected into the external system;
calculating a time period during which the air stream is injected into the external system, said time period determined at least in part by said desired gas concentration, said desired air flow rate and the volume of the external system;
moving the stream of air into the external system at an actual air flow rate;
controlling said actual air flow rate with an air flow device;
injecting at an actual gas flow rate the at least one gas into the air stream;
controlling said actual gas flow rate with a mass flow device; and
ceasing said injecting of said gas into the air stream and said moving of said air stream into the external system upon the expiration of said time period.

22. The method of injecting of claim 21, wherein said mass flow device is an exhaust gas recirculation (EGR) valve.

23. The method of injecting of claim 21, wherein the gas is selected from the group consisting of carbon monoxide, nitrogen oxides, carbon dioxide, nitrogen, hydrocarbons, and any combination thereof.

24. The method of injecting of claim 21, further comprising:
inputting said desired gas flow rate and said time period to a PC based controller, said PC based controller receiving a gas flow rate signal and issuing a gas flow control signal dependent at least in part upon said gas flow rate signal;
inputting said desired air flow rate and said time period to said PC based controller, said PC based controller receiving an air flow rate signal and issuing an air flow control signal dependent at least in part upon said air flow rate signal;
said air flow device issuing said air flow rate signal and receiving said air flow control signal, said air flow device adjusting said actual air flow rate dependent at least in part upon said air flow control signal;
adjusting said air flow control signal such that said actual air flow rate is substantially equal to said desired air flow rate;
said mass flow device issuing said gas flow rate signal and receiving said gas flow control signal, said mass flow device adjusting said actual gas flow rate dependent at least in part upon said gas flow control signal; and
adjusting said gas flow control signal such that said actual gas flow rate is substantially equal to said desired gas flow rate.

25. The method of injecting of claim 24, wherein said air flow device includes a valve and an airmeter, said valve receiving said air flow control signal and said airmeter issuing said air flow rate signal.

26. The method of injecting of claim 25, wherein said air flow device includes a blower that move the air into said external system.

27. The method of injecting of claim 25, wherein said valve includes a throttle, and wherein the step of controlling said actual air flow rate is through the use of a throttle.

28. The method of injecting of claim 24, wherein said ceasing step comprises adjusting said air flow control signal and gas flow signal so that the stream of air stops flowing into the external system.

29. The method of injecting of claim 24, wherein said inputting step comprises inputting a start time and a stop time, said start time corresponding to a time at which said injecting step and said air flow movement step is to commence and said stop time corresponding to a time at which said injecting step and said air flow movement step is to cease.

30. The method of injecting of claim 24, comprising the further step of indicating with an output device at least one of said actual flow rate of the gas, said actual air flow rate of the gas, the amount of time during which said injecting step and air flow movement step have been active, a period of time remaining during which said injecting step and air movement step will be active, said start time, said stop time, said desired gas flow rate, said desired air flow rate, and a mass of the gas contained within the external system.

31. A method of injecting into an air stream a desired concentration of at least one gas to simulate exhaust gas flow into an external system, the external system having a known volume, the desired concentration of the injected gas in the external system being substantially equal to the concentration of the at least one gas contained within an exhaust of one of an ultra-low emissions vehicle and a super-ultra-low emissions vehicle, comprising the steps of:

determining a desired concentration of each at least one gas to be contained within the air stream;

selecting a desired gas flow rate at which the at least one gas is injected into the air stream;

calculating a time period during which the at least one gas is injected into the air stream, said time period determined at least in part by said desired gas concentration, said desired gas flow rate and the volume of the external system;

inputting said desired gas flow rate and said time period to a PC based controller, said PC based controller receiving a gas flow rate signal and issuing a gas flow control signal dependent at least in part upon said gas flow rate signal;

selecting a desired air flow rate at which the air is injected into the external system;

calculating a time period during which the air stream is injected into the external system, said time period determined at least in part by said desired gas concentration, said desired air flow rate and the volume of the external system;

inputting said desired air flow rate and said time period to said PC based controller, said PC based controller receiving an air flow rate signal and issuing an air flow control signal dependent at least in part upon said air flow rate signal;

moving at an actual air flow rate the stream of air into the external system;

controlling said actual air flow rate with an air flow device, said air flow device issuing said air flow rate signal and receiving said air flow control signal, said air flow device adjusting said actual air flow rate dependent at least in part upon said air flow control signal;

adjusting said air flow control signal such that said actual air flow rate is substantially equal to said desired air flow rate;

injecting at an actual gas flow rate the at least one gas into the air stream;

controlling said actual gas flow rate with a mass flow device, said mass flow device issuing said gas flow rate signal and receiving said gas flow control signal, said mass flow device adjusting said actual gas flow rate dependent at least in part upon said gas flow control signal;

adjusting said gas flow control signal such that said actual gas flow race is substantially equal to said desired gas flow rate; and ceasing said injecting of said gas into the air stream and said moving of said air stream into the external system upon the expiration of said time period.

32. A method of calibrating an instrument capable of measuring a very low concentration of at least one gas within a system, said method comprising the steps of:

determining a minimum concentration of gas the instrument is capable of measuring;

simulating the movement of exhaust gas into an external system of known volume, said simulation step comprising:

selecting a desired gas flow rate at which the at least one gas is injected into the air stream;

calculating a time period during which the at least one gas is injected into the air stream, said time period determined at least in part by said desired gas concentration, said desired gas flow rate and the volume of the external system;

inputting said desired gas flow rate and said time period to a PC based controller, said PC based controller receiving a gas flow rate signal and issuing a gas flow control signal dependent at least in part upon said gas flow rate signal;

selecting a desired air flow rate at which the air is injected into the external system;

calculating a time period during which the air stream is injected into the external system, said time period determined at least in part by said desired gas concentration, said desired air flow rate and the volume of the external system;

inputting said desired air flow rate and said time period to said PC based controller, said PC based controller receiving an air flow rate signal and issuing an air flow control signal dependent at least in part upon said air flow rate signal;

moving at an actual air flow rate the stream of air into the external system;

controlling said actual air flow rate with an air flow device, said air flow device issuing said air flow rate signal and receiving said air flow control signal, said air flow device adjusting said actual air flow rate dependent at least in part upon said air flow control signal;

adjusting said air flow control signal such that said actual air flow rate is substantially equal to said desired air flow rate;

injecting at an actual gas flow rate the at least one gas into the air stream;

controlling said actual gas flow rate with a mass flow device, said mass flow device issuing said gas flow rate signal and receiving said gas flow control signal, said mass flow device adjusting said actual gas flow rate dependent at least in part upon said gas flow control signal;

adjusting said gas flow control signal such that said actual gas flow rate is substantially equal to said desired gas flow rate;

ceasing said injecting of said gas into the air stream and said moving of said air stream into the external system upon the expiration of said time period, measuring the concentration of gas in the external system with the instrument;

comparing the measured concentration of the at least one gas with the concentration of the at least one gas contained within the external system; and adjusting the instrument until the measured concentration of the at least one gas is substantially equal to the concentration of the at least one gas contained within the external system.

* * * * *